United States Patent
Hankinson et al.

(10) Patent No.: US 8,172,321 B2
(45) Date of Patent: May 8, 2012

(54) TRANSPORT SEATING

(75) Inventors: Christopher Hankinson, Kingsley (GB); Ian Hamilton Dryburgh, Sparsholt (GB)

(73) Assignee: Contour Aerospace Limited

( * ) Notice: Subject to any disclaimer, the term of this patent is extended or adjusted under 35 U.S.C. 154(b) by 158 days.

(21) Appl. No.: 11/994,490

(22) PCT Filed: Jun. 27, 2006

(86) PCT No.: PCT/GB2006/002360
§ 371 (c)(1),
(2), (4) Date: Jan. 2, 2008

(87) PCT Pub. No.: WO2007/003889
PCT Pub. Date: Jan. 11, 2007

(65) Prior Publication Data
US 2008/0224510 A1    Sep. 18, 2008

Related U.S. Application Data

(60) Provisional application No. 60/774,440, filed on Feb. 17, 2006, provisional application No. 60/702,054, filed on Jul. 22, 2005.

(30) Foreign Application Priority Data

Jul. 1, 2005  (GB) .................................. 0513307.9
Feb. 16, 2006  (GB) .................................. 0603136.3

(51) Int. Cl.
*A47C 15/00*  (2006.01)
*B64D 11/06*  (2006.01)

(52) U.S. Cl. ...... 297/244; 297/248; 297/249; 244/118.6

(58) Field of Classification Search .......... 297/244–249, 297/232; 244/118.5, 118.6
See application file for complete search history.

(56) References Cited

U.S. PATENT DOCUMENTS

| | | | | | |
|---|---|---|---|---|---|
| 464,142 | A | * | 12/1891 | Pooley | 297/244 |
| 1,788,039 | A | * | 1/1931 | Wujcik | 297/244 |
| 2,891,601 | A | * | 6/1959 | Mauser | 297/249 |
| D194,974 | S | * | 4/1963 | Kasparian | D6/379 |
| 3,541,742 | A | * | 11/1970 | Harper | 52/8 |
| 4,382,628 | A | * | 5/1983 | Palmgren | 297/232 |
| 6,209,956 | B1 | * | 4/2001 | Dryburgh et al. | 297/245 |
| 6,669,143 | B1 | * | 12/2003 | Johnson | 244/122 R |
| 7,131,698 | B2 | * | 11/2006 | Dowty et al. | 297/408 |
| D581,174 | S | * | 11/2008 | Beckerman | D6/346 |

FOREIGN PATENT DOCUMENTS

| | | |
|---|---|---|
| EP | 1364874 A | 11/2003 |
| FR | 2554333 A1 * | 5/1985 |
| GB | 1278501 A | 6/1972 |
| WO | WO 0021831 A2 * | 4/2000 |
| WO | WO 2005014395 A1 * | 2/2005 |

* cited by examiner

*Primary Examiner* — David Dunn
*Assistant Examiner* — Tania Abraham
(74) *Attorney, Agent, or Firm* — Jennifer Meredith, Esq.; Meredith & Keyhani, PLLC

(57) ABSTRACT

A novel orientation for a plurality of transport seats within a vehicle, generally consisting of a first seat facing in a first direction, and a second seat facing an opposing direction such that the lateral width of the combined seats is substantially less than in prior art examples. Specific seats and reclining orientations are also disclosed including seats having a unitary structure. A visual barrier is also disclosed, substantially disposed between the first and the second seat to provide a visual barrier between a user in a first seat and a user in a second seat.

31 Claims, 18 Drawing Sheets

TRANSPORT SEATING

RELATED APPLICATIONS

This application is a national stage under 35 U.S.C. 371 of International Application No. PCT/GB2006/002360 filed Jun. 27, 2006 which claims priority to and the benefit of United Kingdom patent application number 0513307.9 filed Jul. 1, 2005, United Kingdom patent application number 0603136.3 filed Feb. 16, 2006, U.S. patent application No. 60/702,054 filed Jul. 22, 2005 and U.S. patent application No. 60/744,440 filed Feb. 17, 2006.

BACKGROUND OF THE DISCLOSURE

The present disclosure relates to transport seating.

SUMMARY OF THE DISCLOSURE

Seating in a transport vehicle is a compromise between space which is equivalent to comfort for the passenger, and accommodation of the maximum number of passengers in the interest of economy for the transport organization Conventionally, seats are arranged in rows. In a row, the tightest lateral pitch of the seats is dictated by passenger shoulder width. This is because passengers sit shoulder to shoulder. In practice, this dictates that the minimum lateral pitch in one form is of the order of 22 inches.

The object of this disclosure has its basis in the realization that if passengers are seated facing alternate directions, with their torsos and shoulders longitudinally spaced from each other in rows, then their comparatively wide shoulders are adjacent their neighbors' comparatively narrow legs. This enables their lateral pitch in the row to be reduced.

One object of the disclosure is to provide improved seating on this basis.

According to one embodiment of the disclosure, there is provided a row of transport seats, each seat having a seat cushion and a seat back, the row having:

at least one seat facing in one direction and at least one adjacent seat facing in the other direction, In one embodiment, the seat cushions are at least partially interdigitated and define a row axis at the median axis of their interdigitated parts and the seat backs, at least when not reclined, are arranged on two lines spaced from the row axis.

Again, in one embodiment, the alternately facing seats are arranged at a pitch along the row axis less than conventional shoulder width, whereby the shoulders of a passenger in one of the seats facing one direction extend over the leg space of the passenger(s) in the oppositely facing adjacent seat(s).

Conventional shoulder width for these purposes is defined as 22 inches or 560 mm.

Whilst it is disclosed that the seats may be of equal width, the one with another, and that the row axis may be straight, as explained below in respect of a variant of the first embodiment the row axis can be curved and end ones of the seats can be narrower than the other seat(s) in the row. Such arrangement takes advantage of end passengers' ability to lean sideways in their seats away from the middle of the row.

In one embodiment, each seat has arm rests and alternately facing seats are arranged at such pitch along the row axis that the arm rests of seats facing in one direction extend partially over the seat cushion(s) of the oppositely facing adjacent seat(s). Additionally or alternatively, alternately facing ones of the seats are arranged at such pitch along the row axis that the arm rests of seats facing in one direction extend partially over space provided for the said seat cushion(s) to extend into on inclination of the respective back-rest.

Again, additionally or alternatively, alternately facing ones of the seats are arranged at such pitch along the row axis that the arm rests of seats facing in one direction extend partially over space left free by the one direction facing seat for the leg(s) of passenger(s) using the opposite facing seat(s).

These arrangements allow the arms and elbows of a passenger facing one direction to overly the thighs or knees of his neighbor. Preferably, the arm rests of adjacent seats are aligned with each other. They may be continuous and/or shaped for use by respective passengers. A central dividing rib may be provided.

In certain embodiments the row of transport seats will include a divider extending or extensible between each pair of adjacent seats at least at head height in the seats. The divider may be provided simply as a screen extending forwards from one side edge at the top of the back of one seat to the nearest side edge at the top of the back of the adjacent seat. It may be rigid or it may be flexible, preferably it is sufficiently robust to act as a head rest. Whilst the major purpose of the screen is to provide privacy between adjacent passengers, the screen may be drawable to allow conversation.

Alternatively the screen may be a rigid serpentine divider. In this case, at seat cushion level, the divider can have portions on opposite sides of each seat cushion; whilst at shoulder level or at the levels of the tops of the seat backs, the divider is of re-entrant shape, providing greater shoulder width than the inter-digitated seat cushion width.

The greater shoulder width in one form may not extend down as far as elbow level. However, the divider may extend down at the wider width to just below the level of arm rests and curves in at this level, whereby it partially overlies the seat cushion of the adjacent seat.

In accordance with another important feature, the individual seats may define a shoulder width, which overlaps with the shoulder width of the oppositely facing adjacent seat or seats.

The arrangement of the seats in the row enables the length of the row to be less than the sum of the shoulder widths of the seats in the row. In one form, this enables a two inch reduction in the seat pitch. In a wide bodied aircraft, typically with eight/nine seats per row, this enables an increase in one in the number of seats across the aircraft. By the same token, this enables an increase in the pitch of the rows of seats longitudinally in the aircraft, with a concomitant increase in passenger legroom, for the same number of passengers accommodated.

In one form the seats will have reclining backs. Conveniently this provision is by fixed back seats having seat pans (carrying the seat cushions) which slide forwards on inclination of the seat backs within the fixed backs. This has the advantage of the inclination of seats in successive rows not combining to obstruct passenger access with the rows.

It should be noted that the disclosure is not restricted to rows where the seats alternately face opposite directions. For instance, in a four seat row, the outer seats can face one direction and the inner two, adjacent seats face the other direction. Such arrangement still benefits from the disclosure at the abutment of the two pairs of opposite facing seats.

In accordance with a further important feature of the disclosure there is provided a transport seating row of our Earlier Patent Application, herein incorporated by reference, provided with:

means for structurally unifying the seats in the row and legs extending down beneath the unified seats at their fronts, the back of each seat being supported by a leg beneath the front of an adjacent seat.

In certain forms, the bottom ends of the seat-front legs will be secured to floor-level beams extending at least substantially in the direction of the row, the floor level beams being secured in use to the floor of the aircraft on or immediately above the floor.

Where the seats have individual structures, the structurally unifying means can be a beam extending in the direction of the row with the seat structures connected to it. The legs can extend down from the beam. Again, the legs can be part of the seats' individual structures.

However, in the preferred embodiment, structural components of the seats and the row-wise beam are formed as a single framework, including the legs.

Alternatively the seat structures can be unified, for instance by manufacturing them as a single molding, with the legs being unified with the seat structures.

In accordance with a yet further important feature, each seat has:

an inner back frame at a back portion of the seat structure and—an inner cushion member at a cushion portion of the seat structure, the back frame and the cushion member being hinged together, with:

the inner back frame resting against the seat back portion at an upper part thereof and the inner cushion member being slidably mounted on the seat cushion portion, the arrangement being such that the inner cushion member can be slid forwards with the inner back frame reclining.

In one form the inner back frame rests against the seat back portion at a central position whereby the upper part of the inner back frame twists to accommodate a user twisting to one side in the seat.

Conveniently the back frame and the cushion member may be molded of composite material.

BRIEF DESCRIPTION OF THE DRAWINGS

To help understanding of the disclosure, a specific embodiment thereof with variations will now be described by way of example and with reference to the accompanying drawings, in which.

DESCRIPTION OF THE PREFERRED EMBODIMENTS

Figure 1:
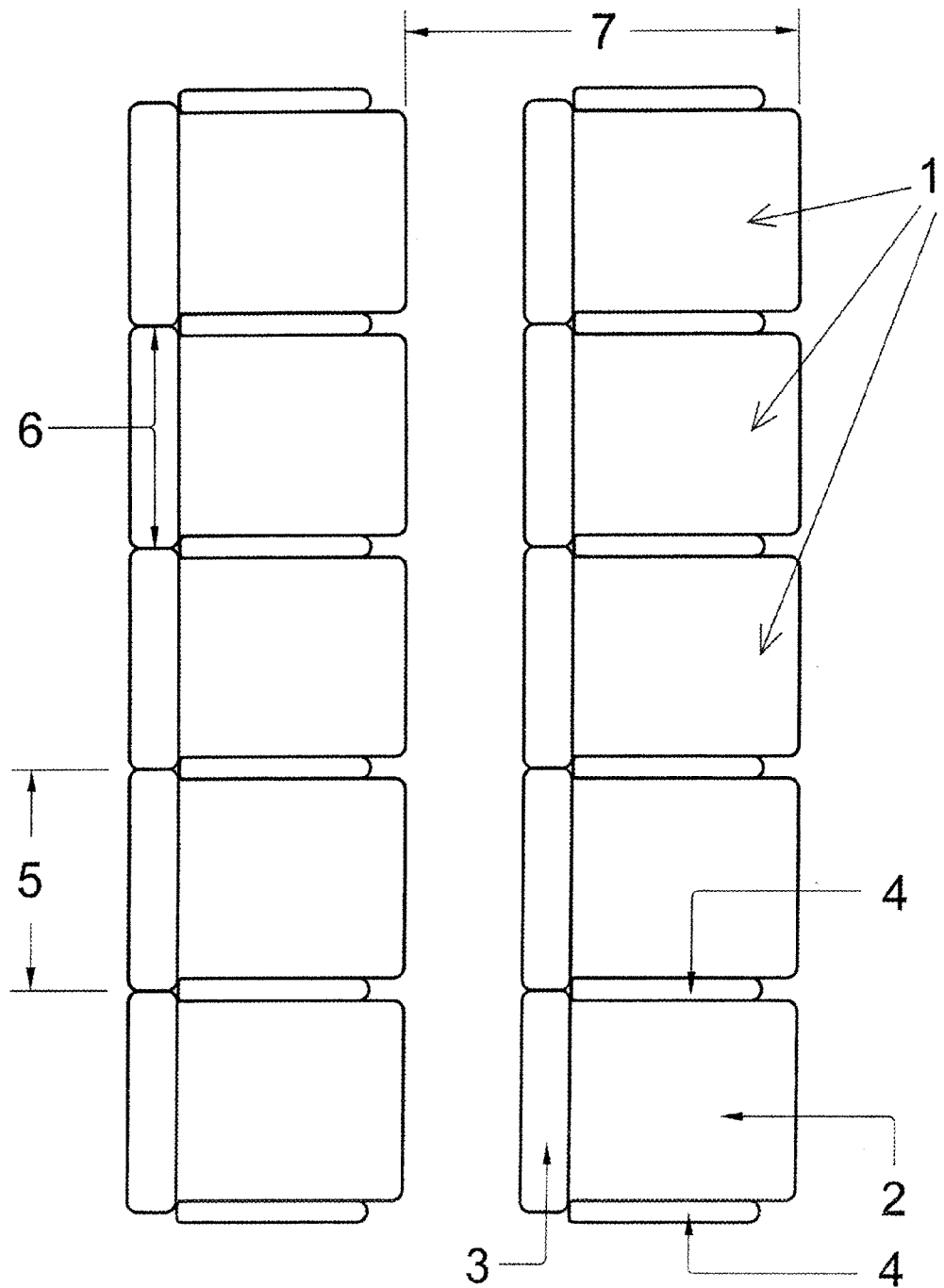
FIG. 1 is a plan view of two rows of conventional aircraft seats.
Figure 2:
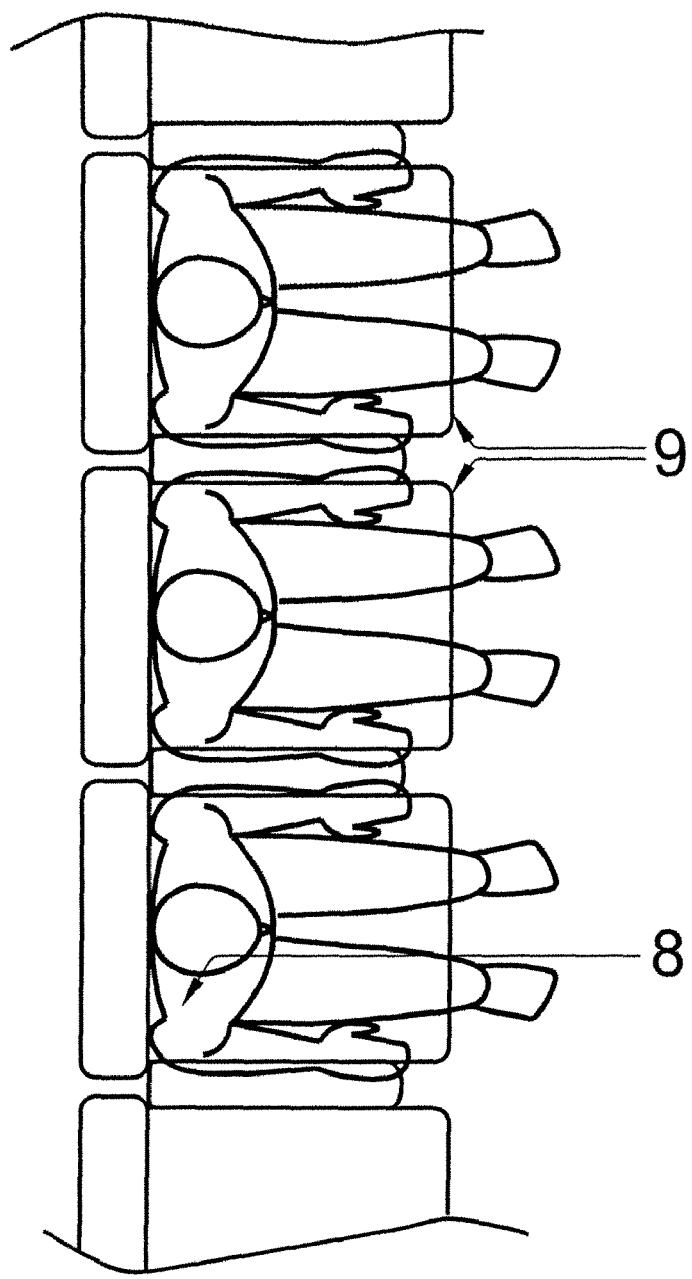
FIG. 2 is a scrap view showing passengers seated in three of the conventional seats.

Referring to the drawings, FIG. 1 shows two rows of conventional seats 1. Each seat has a cushion 2, a backrest 3 and a pair of arm rests 4, which are shared where the seats have neighboring seats. The back rests are provided with minimal gaps therebetween. The pitch 5 of the seats is determined by the shoulder widths 6 of their back rests. The two rows are spaced apart by a longitudinal pitch 7. FIG. 2 shows a number of passengers 8 sitting shoulder to shoulder in representative ones of the seats 9.

Figure 3:
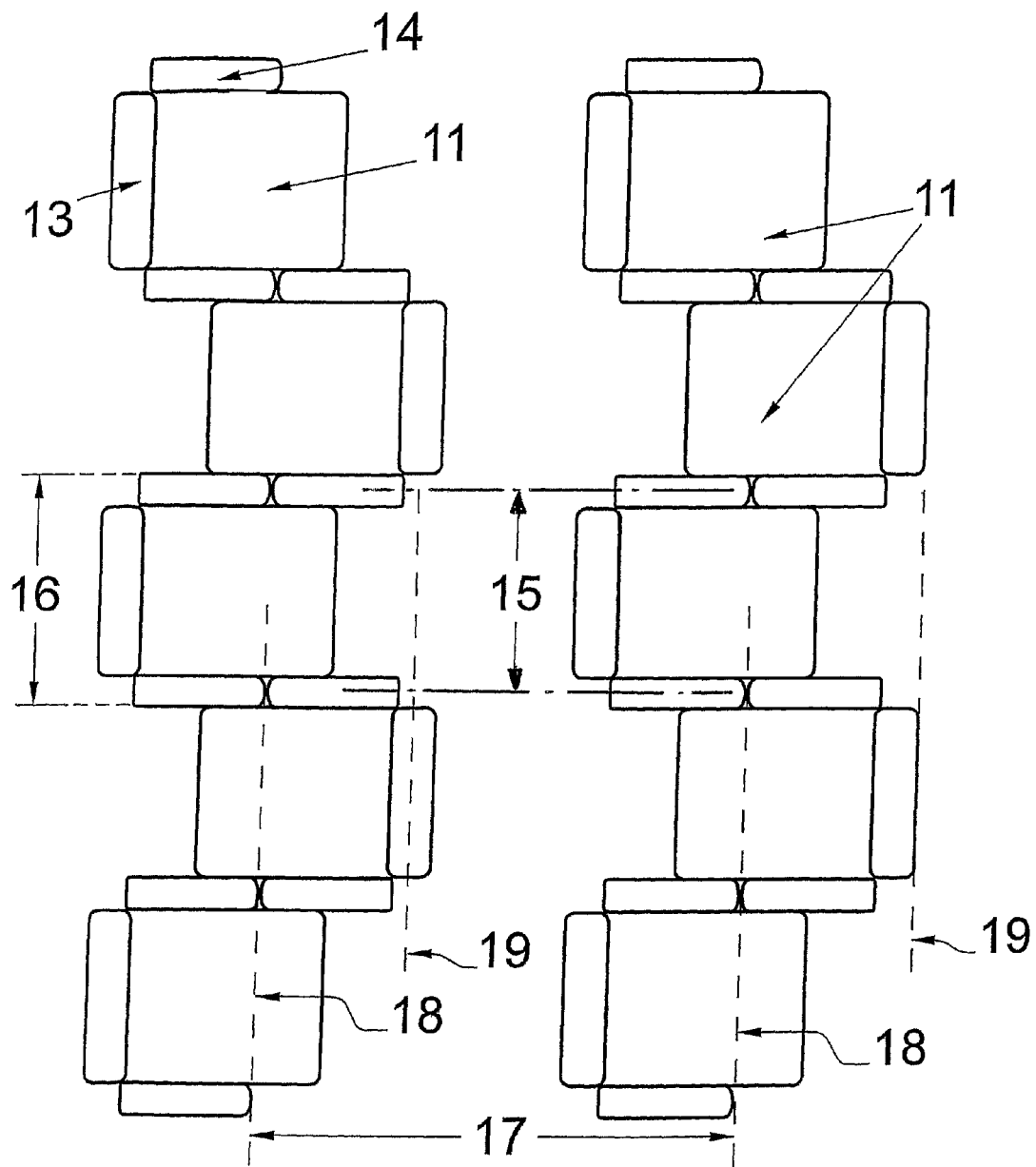
FIG. 3 is a similar view of two rows of seats, inter-seat screens shown in FIG. 4 being omitted from FIG. 3 for clarity.

Turning to FIG. 3, the seats 11 thereshown are facing in alternate directions in their rows. They have cushions 12, backrests 13, arm rests 14. The shoulder widths 16 of these seats are the same as those of the seats 1 of FIG. 1. However, the conventional seats have their shoulder width extending to the center of the arm rests of their seats. In other words, the arms rests are at the seat lateral pitch 5. In FIG. 3, the shoulder width extends to the full width of the arm rests. In other words, the arm rests are set in and are arrange at a reduced pitch 15, which is the seat lateral pitch. This is of no inconvenience to the passengers, in that the latter are widest at their shoulders and there is room for their hips between the set in arm rests. The rows are set at a longitudinal pitch 17, shown as the distance between central axes of interdigitated parts of the seat cushions. The seat backs are set on two lines 19, parallel with but spaced from the axes 18.

Figure 4:
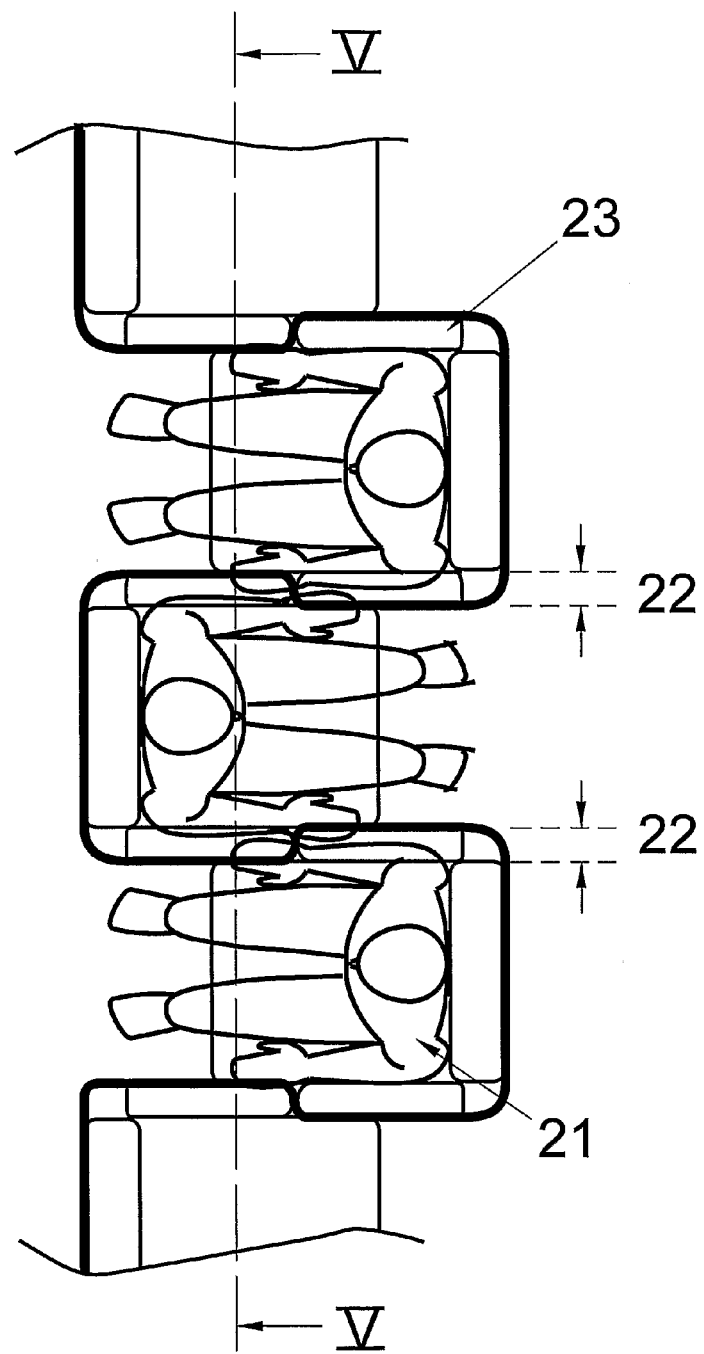
FIG. 4 is a scrap view similar to FIG. 2 of three passengers in seats.

The arrangement is such that, as shown in FIG. 4, which shows three broad shouldered passengers 21, their shoulders overlap 22 along the row, whilst being staggered in the row.

Also shown in FIG. 4 is a sinuous screen 23 screen the passengers from looking directly at their neighbors.

Comparing FIGS. 1 & 2 with FIGS. 3 & 4, it will be appreciated that the passengers are provided with the same shoulder room in the disclosure, whilst having additional leg room. As drawn the deck area (namely the seat pitch times the row pitch) in both arrangements is equivalent, with the arrangement of the disclosure occupying a marginally smaller area. It will be appreciated that by arranging the seat width and pitch such that an additional seat can be accommodated across the body of an aircraft, either additional leg room or an increase in the number seat rows, i.e. an increase in the number of passengers, can be accommodated.

Figure 5:
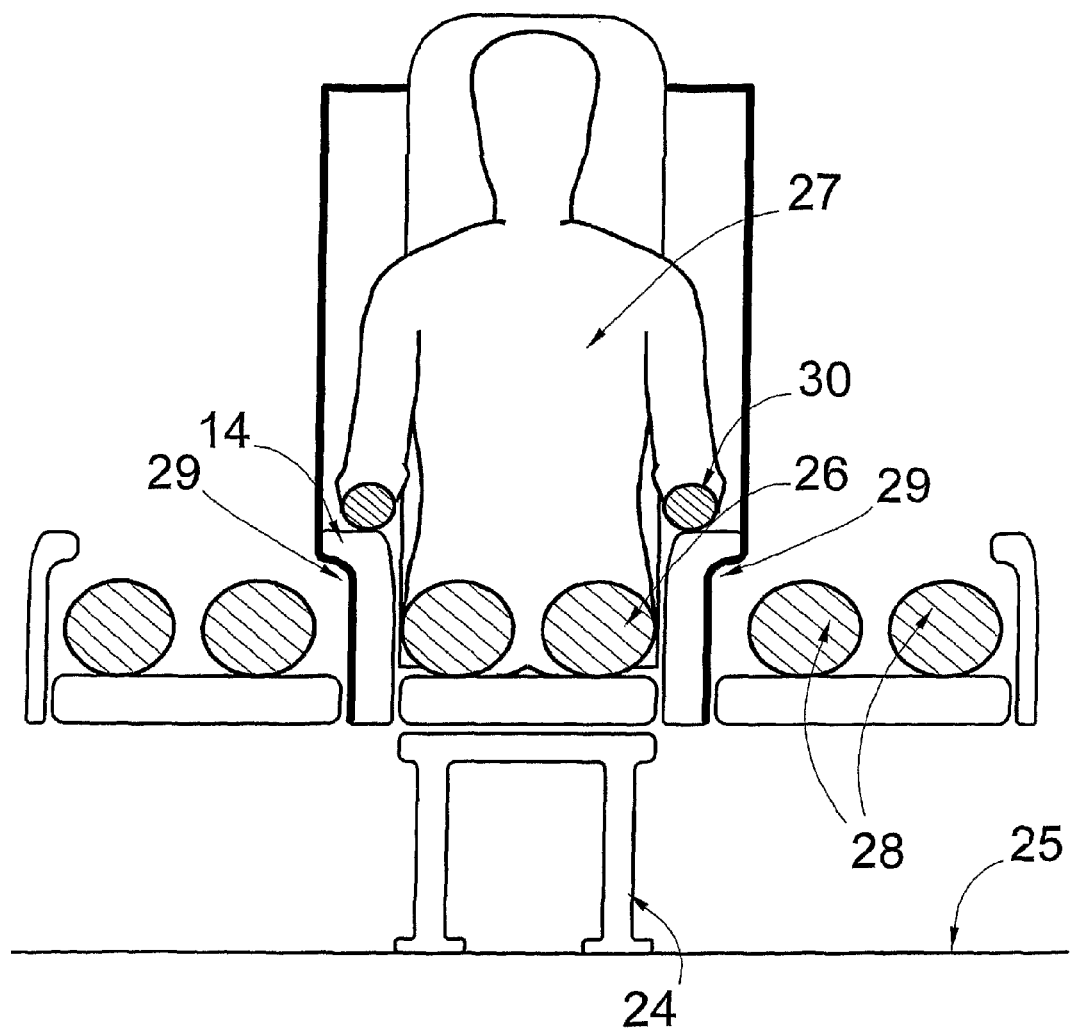
FIG. 5 is a partially sectioned front view of the central seat of FIG. 4, the section taken on line V-V in FIG. 4.
Figure 6:
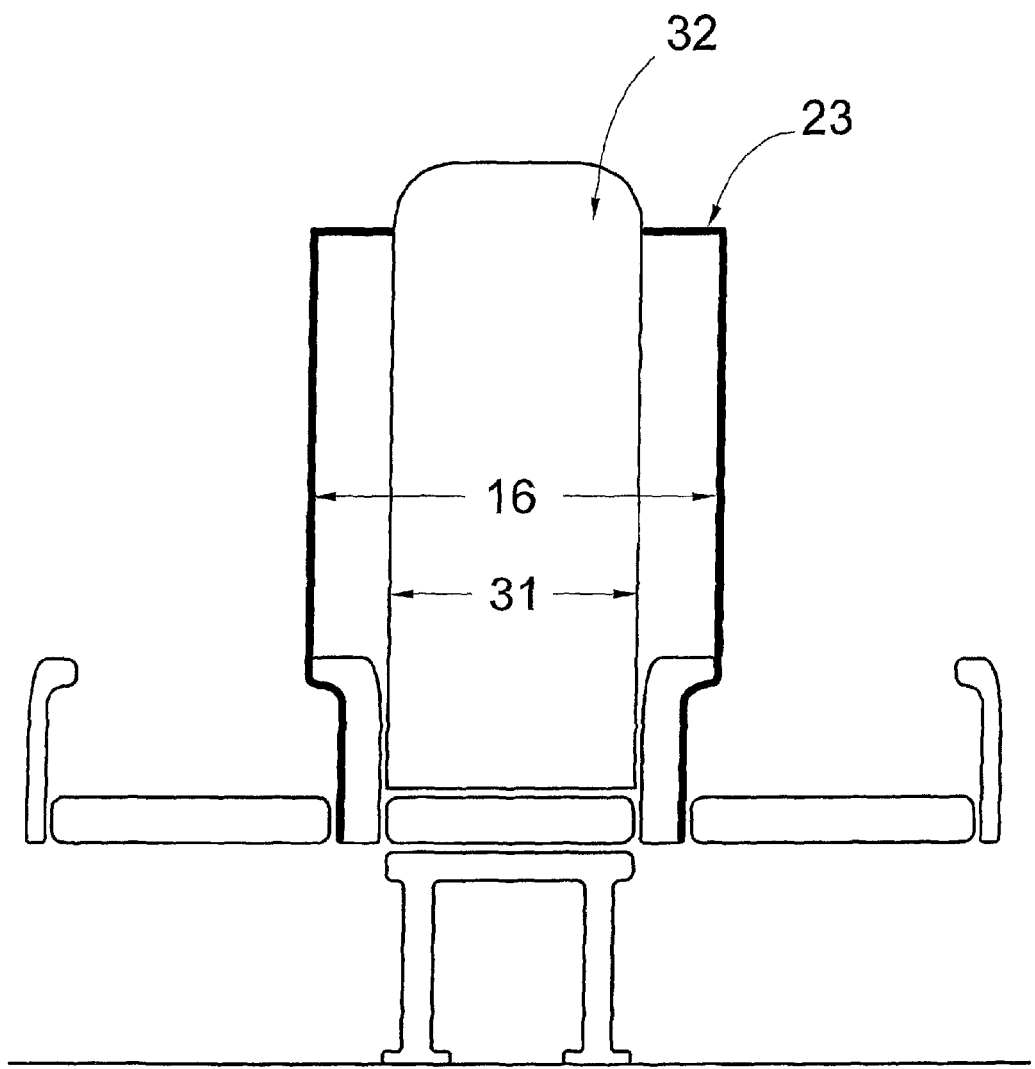
FIG. 6 is the same view as FIG. 5, with the passengers omitted.

Referring now to FIG. 5, a central seat as shown has a chassis 24, supporting it on a deck 25. Structural details are omitted. The section of the view is taken a small distance to one side to the row axis of the row and passes through the legs 26 of the passenger 27 in central seat and the legs 28 of the passengers in adjacent seats. The passenger 27 has his legs between upright sides 29 of the seat, which are part of the screen 23 and support the arm rests 14 on which the passenger's arms 30 are resting. The arm rests as shown are not used by the opposite facing passengers whose torsos, arms and arm rests of their seats are above the plane of the paper. However, FIG. 5 does show accommodation beneath the arm rests 14 for the legs 28 of the passengers in the adjacent seats. FIG. 6 is the same view without the passengers, showing how the back rest of the central seat has a width 31 equal to that of the seat cushion. The seat cushions are parallel throughout their length back to the seat back, whereby the neighboring passengers are provided with the leg room described in the preceding paragraph. The back rest has a narrower head rest 32 at its top, whilst the available shoulder width 16 is defined by the internal width of the screen 23.

Figure 7:
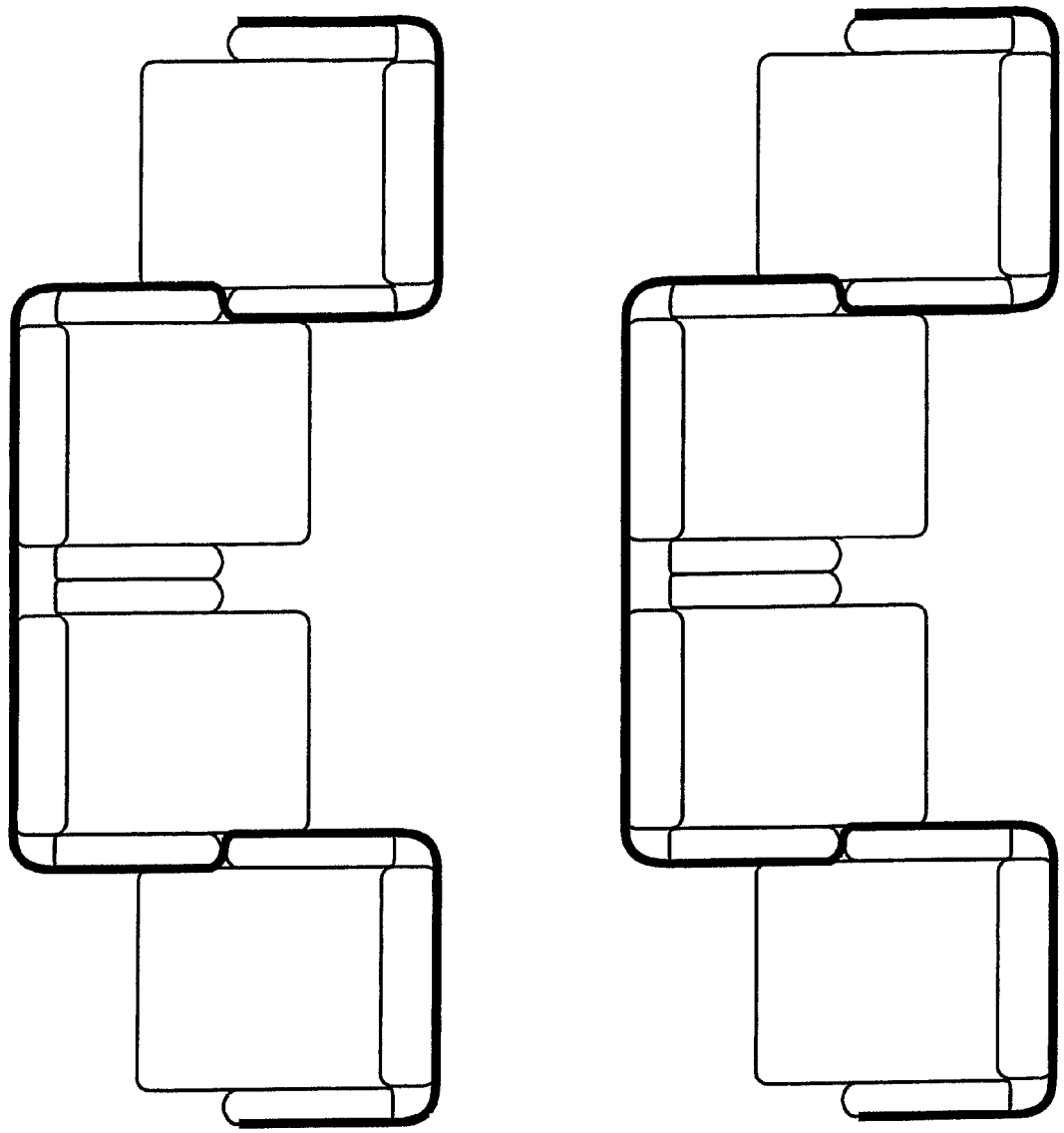
FIG. 7 is a plan view of two alternative rows of seats.

FIG. 7 shows an alternative configuration of a row of seats in accordance with the disclosure, in which two central seats face one direction and their outer neighboring seats face in the opposite direction. The central seats are set marginally wider apart to provide full shoulder room for their passengers. In other words the overlap 22 shown in FIG. 4 is not provided between the two central seats. The seats are all the same. The result is duplication of the arm rests at the center of the row.

Figure 8:
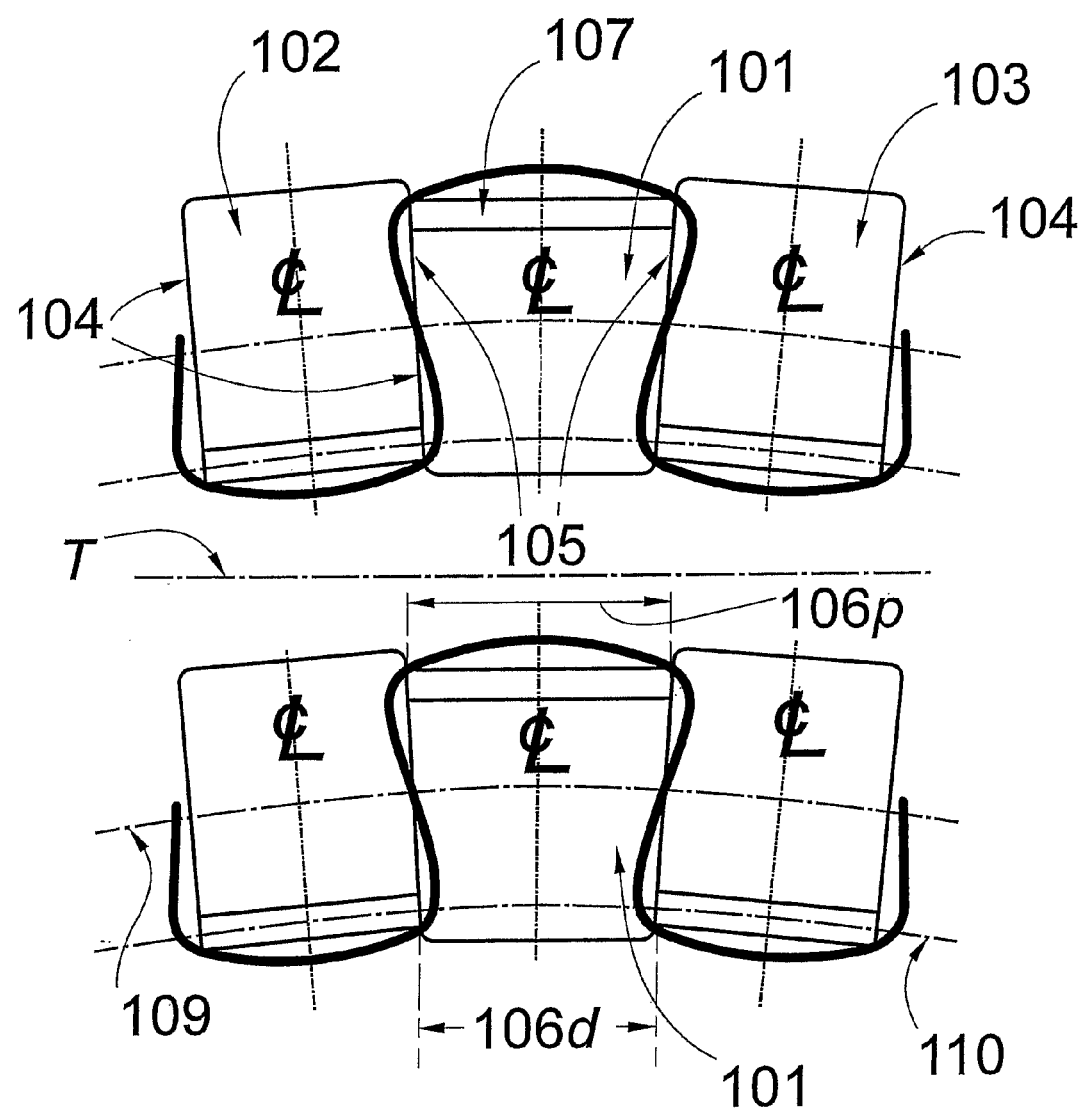
FIG. 8 is a view similar to FIG. 7 of an alternative layout of a three seat row.

Turning now to FIG. 8, in one form, the seats in the two rows thereshown are set at differing angles within each row and are of differing widths. The center seats 101 have the center lines of their seat cushions which are perpendicular to an axis T transverse an aircraft. Within each row, the two neighboring seats 102,103 can be set with the seat cushion center lines diverging by a few degrees, 5[deg.] as drawn, from the corresponding center line of the central seat. These seats have edges 104 of their seat cushions which are parallel in the distal/proximal direction to the center lines. The central seat has its seat cushion edges parallel to those of its immediate neighbors, whereby the distal edge 106a is shorter than the proximal edge 106p. This arrangement enables the back 107 of the central seat to be wider than that 108 of the neighboring seats, typically in the proportion 20<1>A inches to 18 inches. This gives greater shoulder room to the central seat. In this arrangement, the row axes 109 are curved and the back lines 110 also are curved. In one form, this arrangement can be set in an aircraft at a row pitch of 37 inches.

Figure 9:
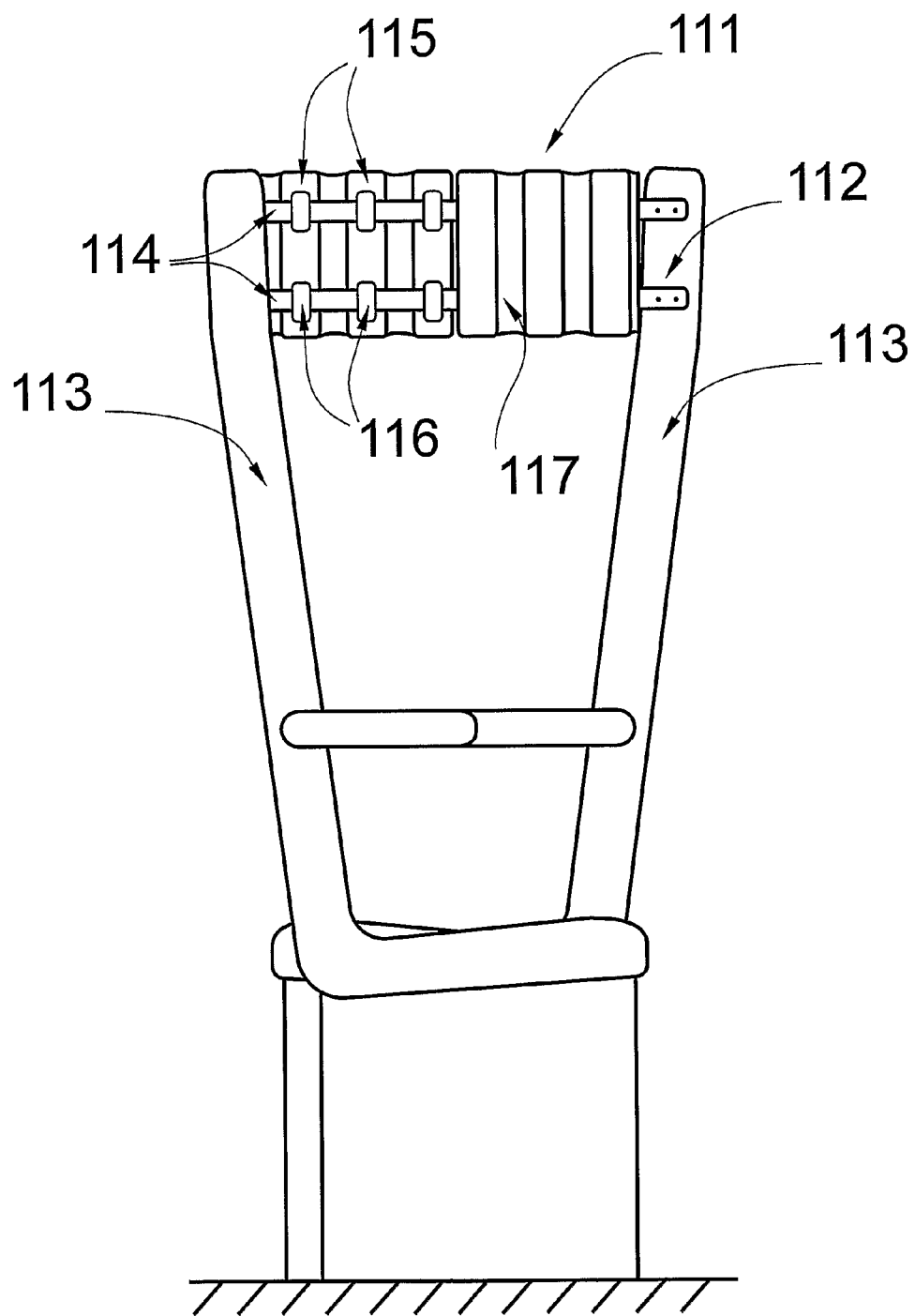
FIG. 9 is a side view of two seat in a row, showing a drawable divider.
Figure 10:
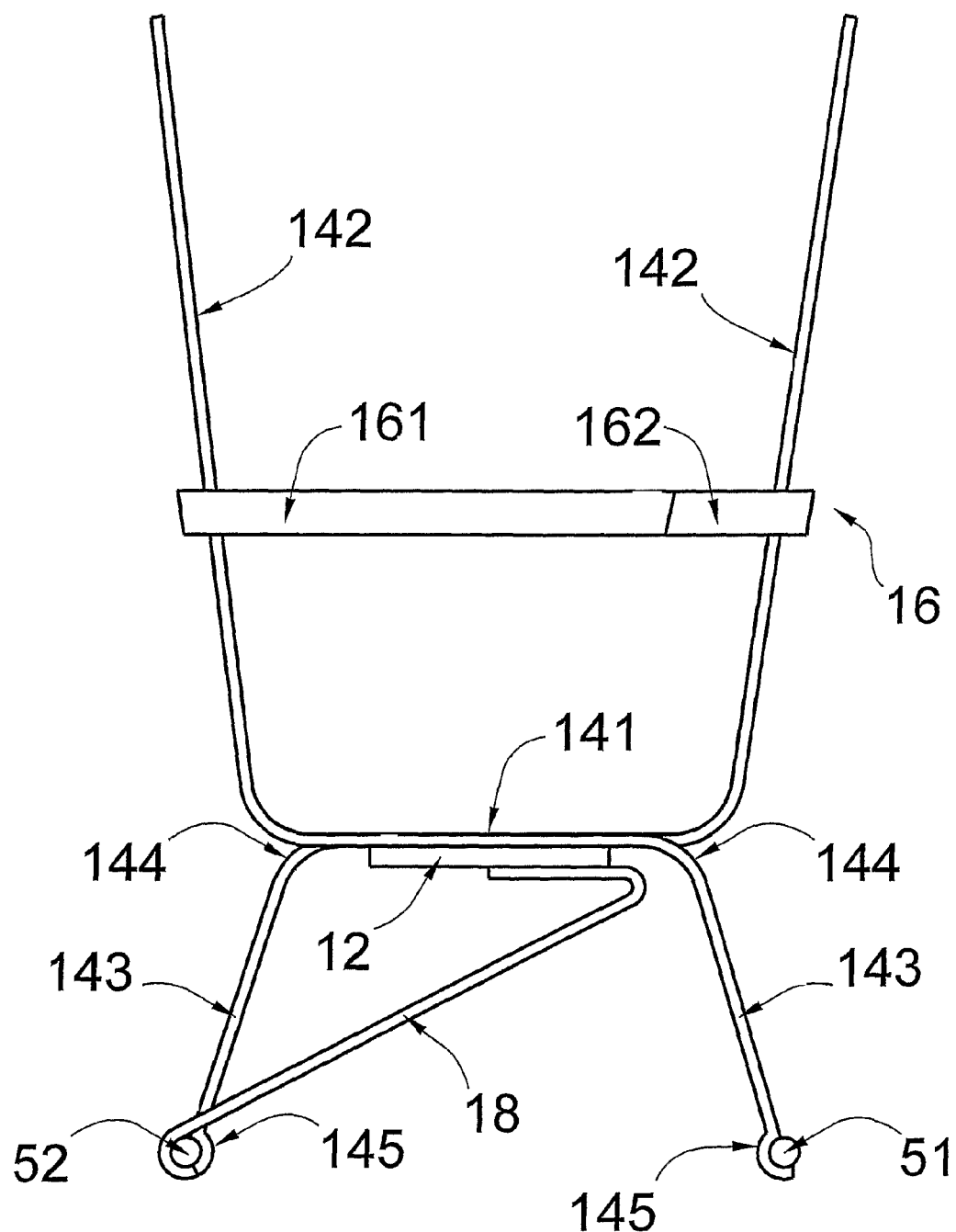
FIG. 10 is a row-end view of a framework for a row of seats.
Figure 11:
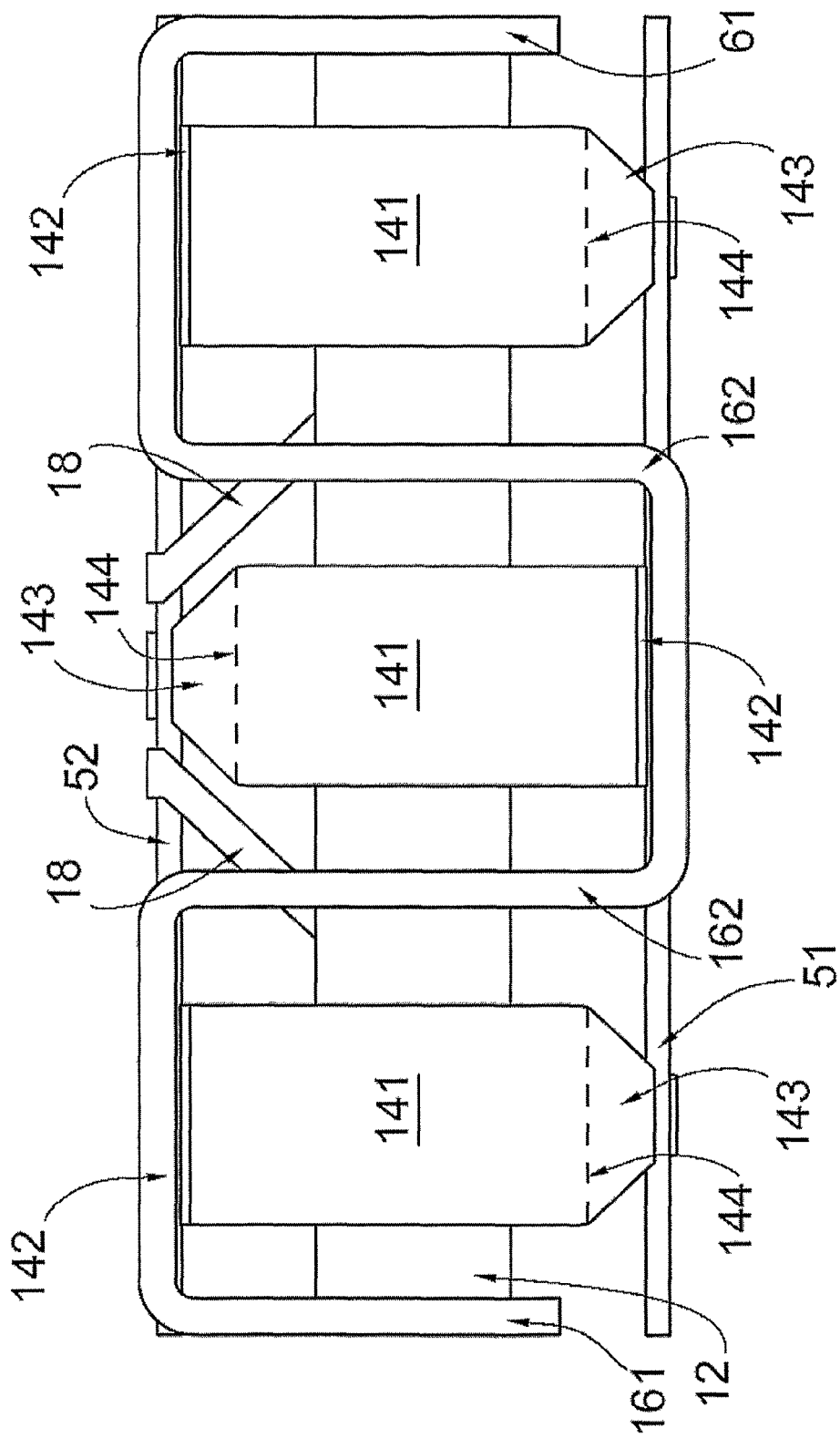
FIG. 11 is a plan view of the framework of FIG. 10.
Figure 12:
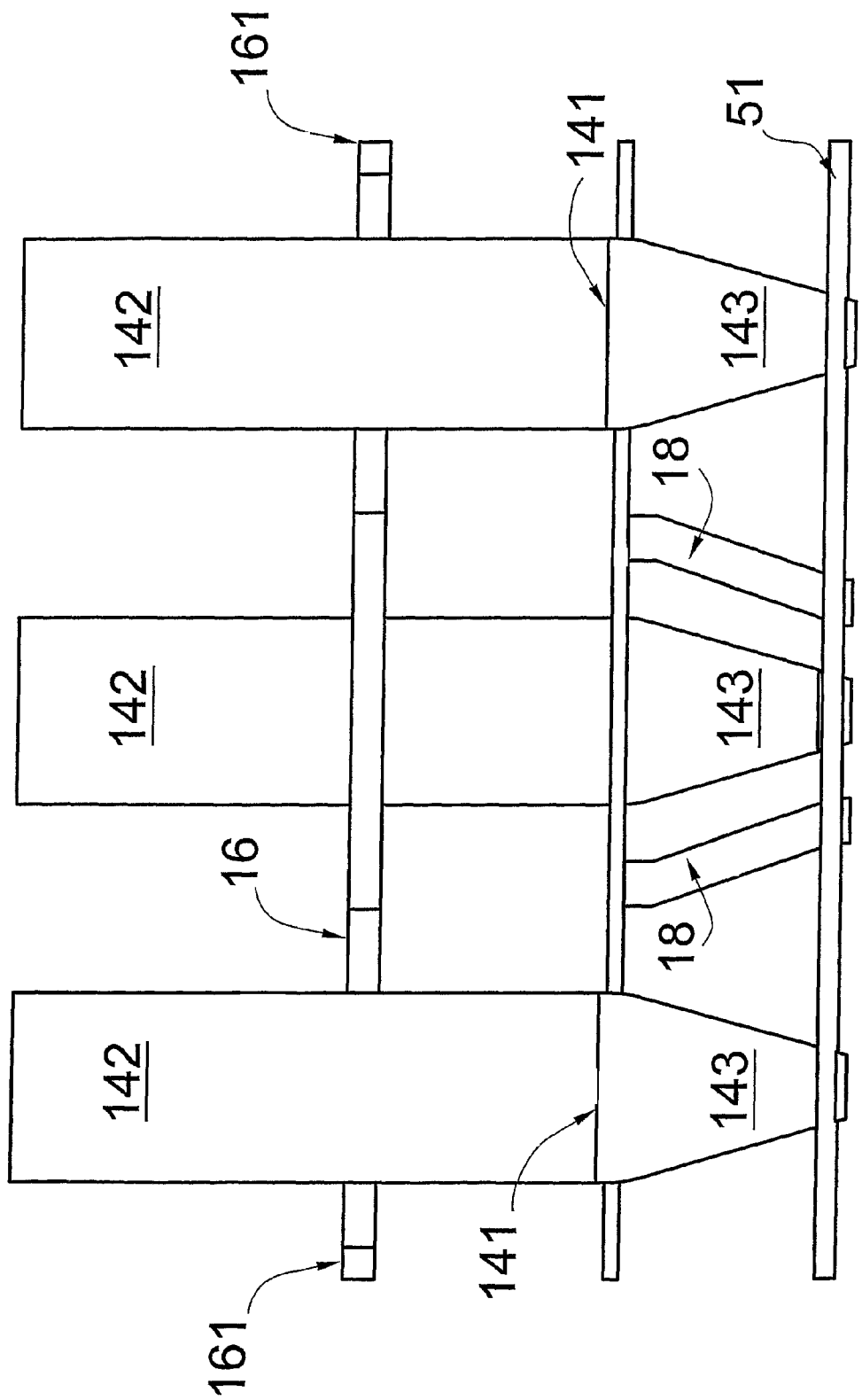
FIG. 12 is a front view of the framework of FIG. 10.
Figure 13:
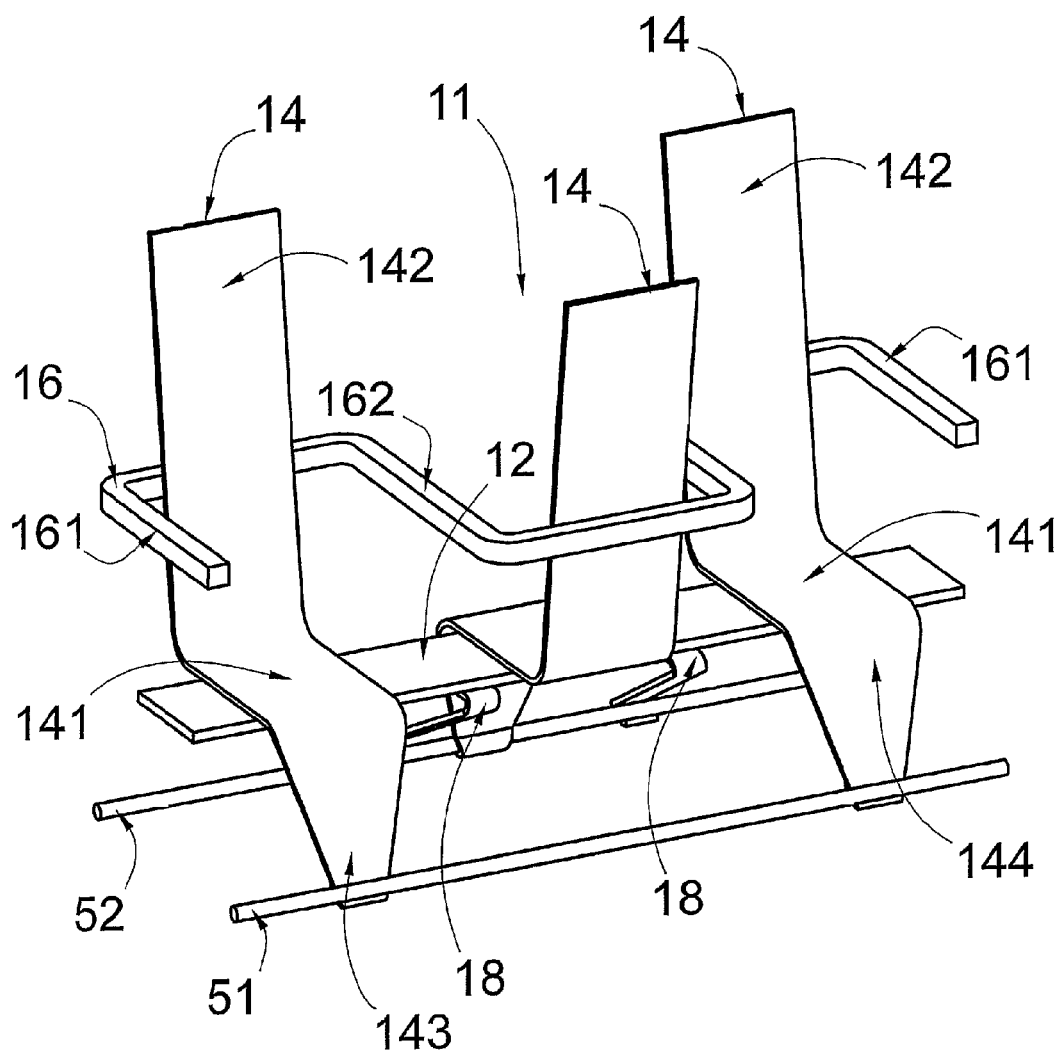
FIG. 13 is a perspective view from the front and above of the framework of FIG. 10.

FIG. 9 shows a divider 111 between side edges 112 at the tops of two seat backs 113 at head height in a row comprising an upper and lower pair of straps 114, having slats 115 carried by loops 116 stitched to the slats. Webs 117 are provided between the slats in the manner of the webs in a fan. This divider is in two halves, each fixed to the respective backs and able to be extended to each other or drawn as desired by the neighboring passenger.

In another form, it is envisaged that the back rest could recline within the screen 23 with the seat cushion sliding forwards as the back reclines. Further, the back rest need not be restricted to the width of the seat cushion, consistent with it fitting within the screen. The latter need not extend as a single unit below the level of the seats' arm rests.

Referring to another embodiment shown in FIGS. 10 to 14, for an aircraft a row 1A of two forwards facing seats 2A,3A and one rearwards-facing, interposed seat 4A has a framework 11A, possibly manufactured of composite sheet material. The composition of the sheet material is the subject of our patent applications Nos EP 1,418,046 and U.S. Ser. No. 10/699,077 that is incorporated by reference. Suffice it to say here that the material in one form comprises two outer laminates of PEI material bonded to an inner cellular material. This material can be formed into flat and shaped panels at elevated temperature and pressure.

The framework in one form is comprised of four types of panel:
  a transverse, i.e. row direction, elongate beam 12A,
  three seat forms 14A, of lazy Z shape
  a sinuous armrest support 16A,
  two triangulation struts 18A.

The framework may be secured to a pair of floor beams 51A, 52A fixed in conventional manner to the floor rails (not shown) of an aircraft floor or deck, not shown.

In one form, middle, seat pan portions 141A of the seat forms 14A are bonded crosswise to the top surface of the transverse beam. The forms have seat back portions 142A, of which two are arranged on one side of the beam 12A for the forward facing seats and one on the other side for the rear facing seat. The forms also have leg portions 143A, which extend down from the seat front edges 144A of the seat portions 141A to respective ones of the floor beams, which extend transversely of the aircraft and are spaced longitudinally of it. Thus the leg portions of the outer two, forwards facing seats extend to the forward floor beam 51A and the leg portion of the rearwards facing seat extends to the aft floor beam 52A. The distal ends of the leg portions may be shaped 145A to partially encompass the floor beams, whereby they positively locate with the beams and can be readily fixed to them with non-shown fixtures.

To triangulate the framework, not only laterally, but principally fore and aft, the struts 18A extend down from the forwards edge of the underside of the transverse beam, to which they are secured midway between the respective outer seat forms and the central seat form, to the aft floor beam at respective sides of the leg of the rear facing seat. The struts are secured to the floor beam in like manner to the leg portions 143A.

Thus the transverse beam and the seat pan portions 141A may be rigidly located with respect to the floor beams and able to accommodate test loads applied to seat belts, not shown, attached directly or indirectly to them.

In one form, the back portions 142A of the seats have the arm rest support 16 attached to their back faces. The support is deep to give it bending strength in its end parts 161A, which extend forwards from the back portions and are otherwise unsupported.

Central parts 162A, which extend from the back portion of the rear facing seat to that of the forwards facing seat, are supported at both ends as arm rest supports, but perform the additional function of reinforcing the back of the rear facing seat against collapse under a passenger's inertia in crash conditions.

Figure 14:
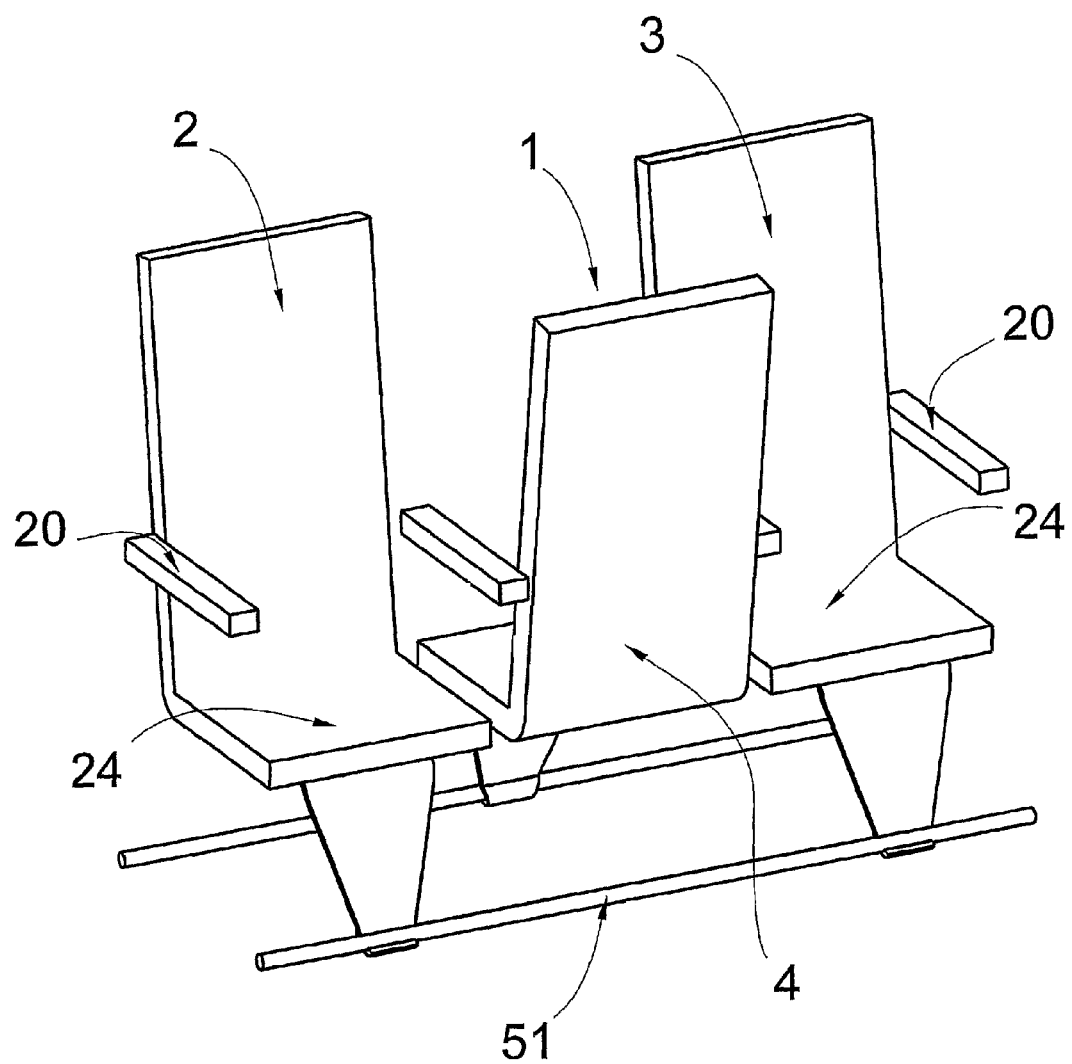
FIG. 14 is a similar view of the row of seats upholstered for use.
Figure 15:
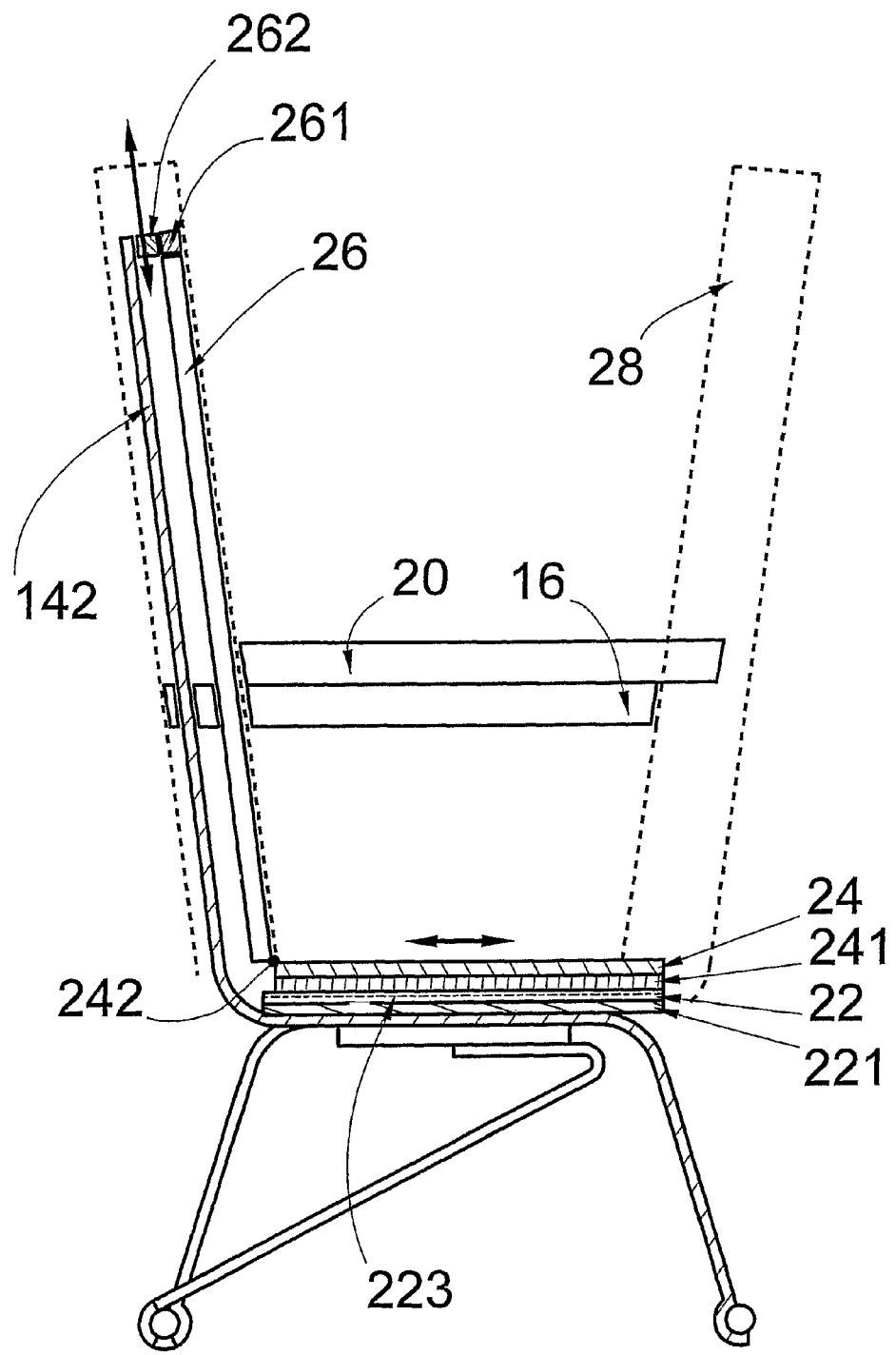
FIG. 15 is a cross-sectional end view in the same direction as FIG. 10 and on the line VI-VI in FIG. 16 through the end seat of the row, showing some upholstery in dashed lines.
Figure 16:
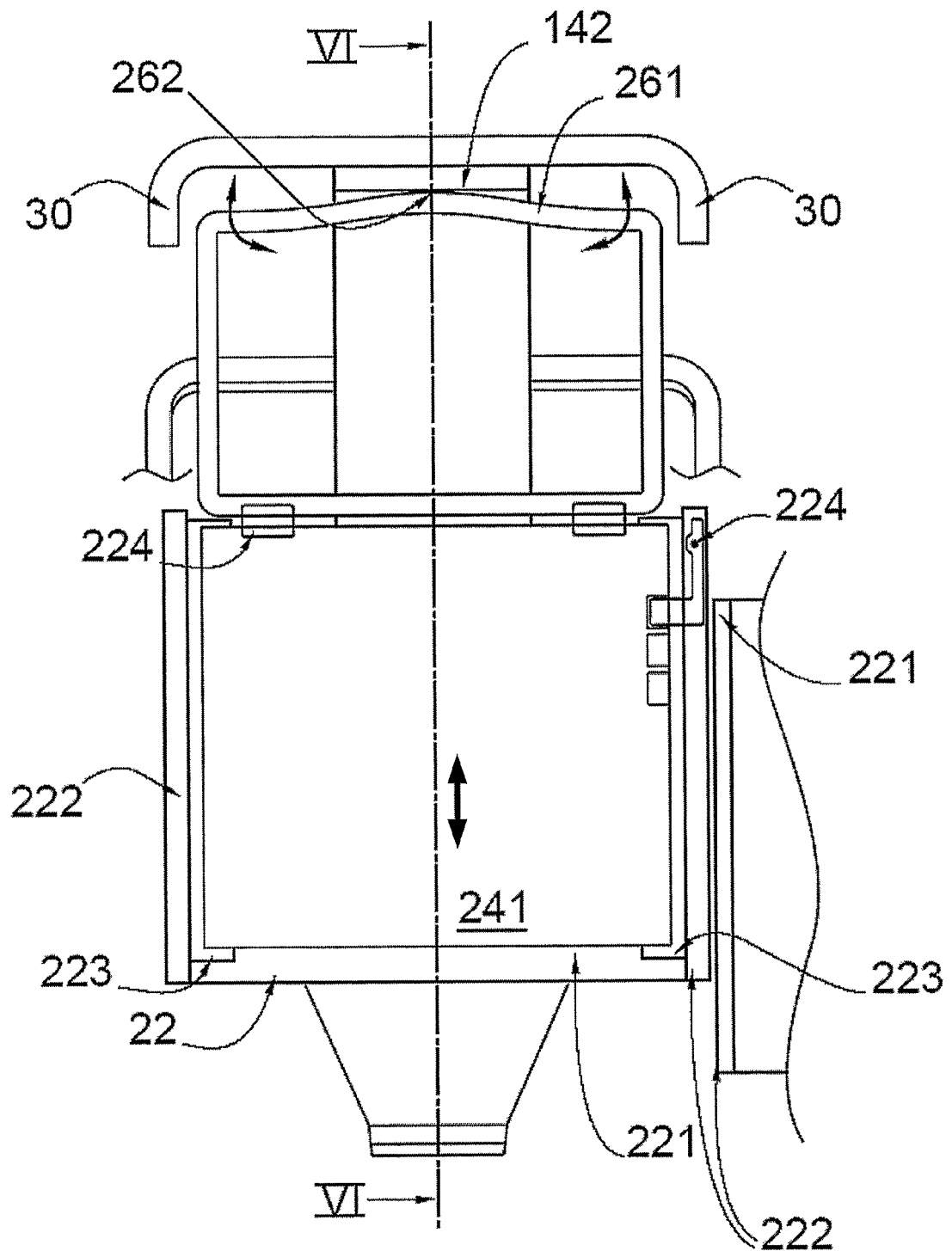
FIG. 16 is a plan view of the end seat, sectioned in FIG. 15 and showing no upholstery, no arm rests and no seat cushion.

Turning on to FIGS. 14 to 16, further passenger supporting elements are shown:
  arm rests 20B,
  seat pans 22B,
  seat cushions 24B,
  back frames 26B.

Please note that coverings and upholstery 28B are shown partially in FIG. 15.

The arm rests 20B are secured to the arm rest supports 16B in any convenient manner. The rests can be of the same composite material as the supports, the two being bonded to each other.

The seat pans 22B in one form also can be of a composite material, although typically of thinner construction, possibly laminated without a cellular core. The pans in one form have a central pan section 221B of greater width than the seat pan portions 141B of the seat forms 14B, such that the seat pan of the rear facing central seat abuts the seat pan of the outer forwards facing seats. The abutment may be at up-turned edges 222B of the pans. The abutted edges are bonded together to enhance the stiffness of the row of seats. At the edges, the pans carry runners 223B for solid bases 241B of the seat cushions. Again, the bases can be of composite material, with conventional seat padding and upholstery over the bases.

Latches 224B are provided for setting the fore-and-aft position of the seat cushion on the runners with respect to seat pan.

The rear edges of the bases 241B in one form provided with hinges 242B, by means of which the bases are connected to the back frames 26B. These latter are hoops of composite material, formed with a concave curvature of an upper cross-member 261B, when viewing the seat back from the opposite end of the seat cushion. A central part 262B of the cross-member rests against the top of the back portion 142B of the seat form. The arrangement is such that when a user of the seat leans with one shoulder more heavily against the upholstery of the back frame, the side of the frame deflects backwards, allowing the user to turn partially and lean into the corner of the seat. Hinge connection of the back frame allows the latter to be partially reclined as the seat base is moved forwards on the runners 223B.

Shown in FIG. 16 is a variant of the seat described above in which head-level wings 30B have been added to the top of the back portion 142 in the manner of the arm rest supports, except that the wings are squat-U-shaped and not interconnected. The wings support upholstery for the seat back, or at least that part of the seat back not supported on and constituted by the back frame.

Figure 17:
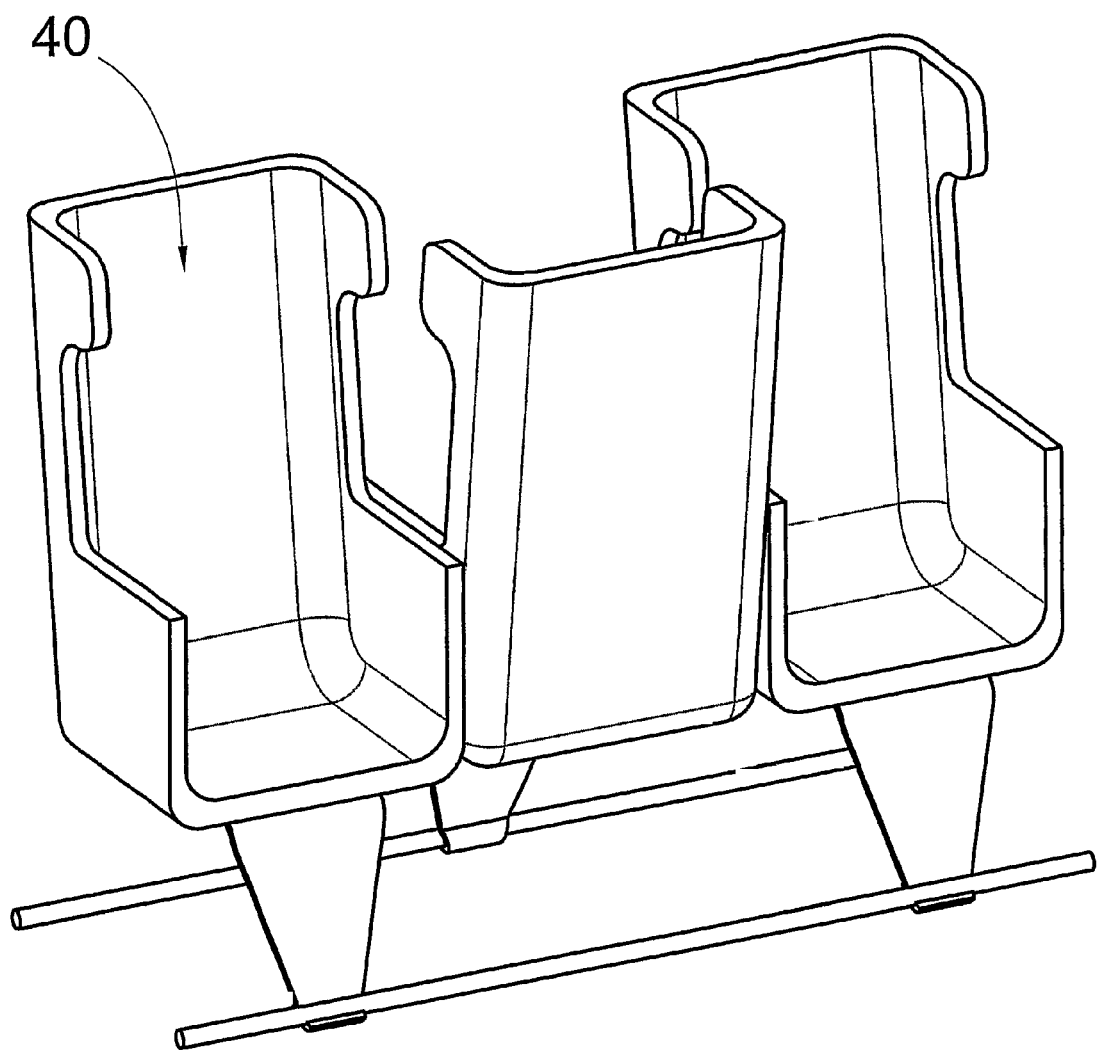
FIG. 17 is a view similar to FIG. 11 showing the framework of FIG. 11 covered by molded shells.

A further variant is shown in FIG. 17, in which a molded shell 40C is fitted over the seat back portions 142C and the arm rest support 16C, neither of which are therefore visible in the figure. It is anticipated that the shell will need to be molded in sections.

Figure 18:
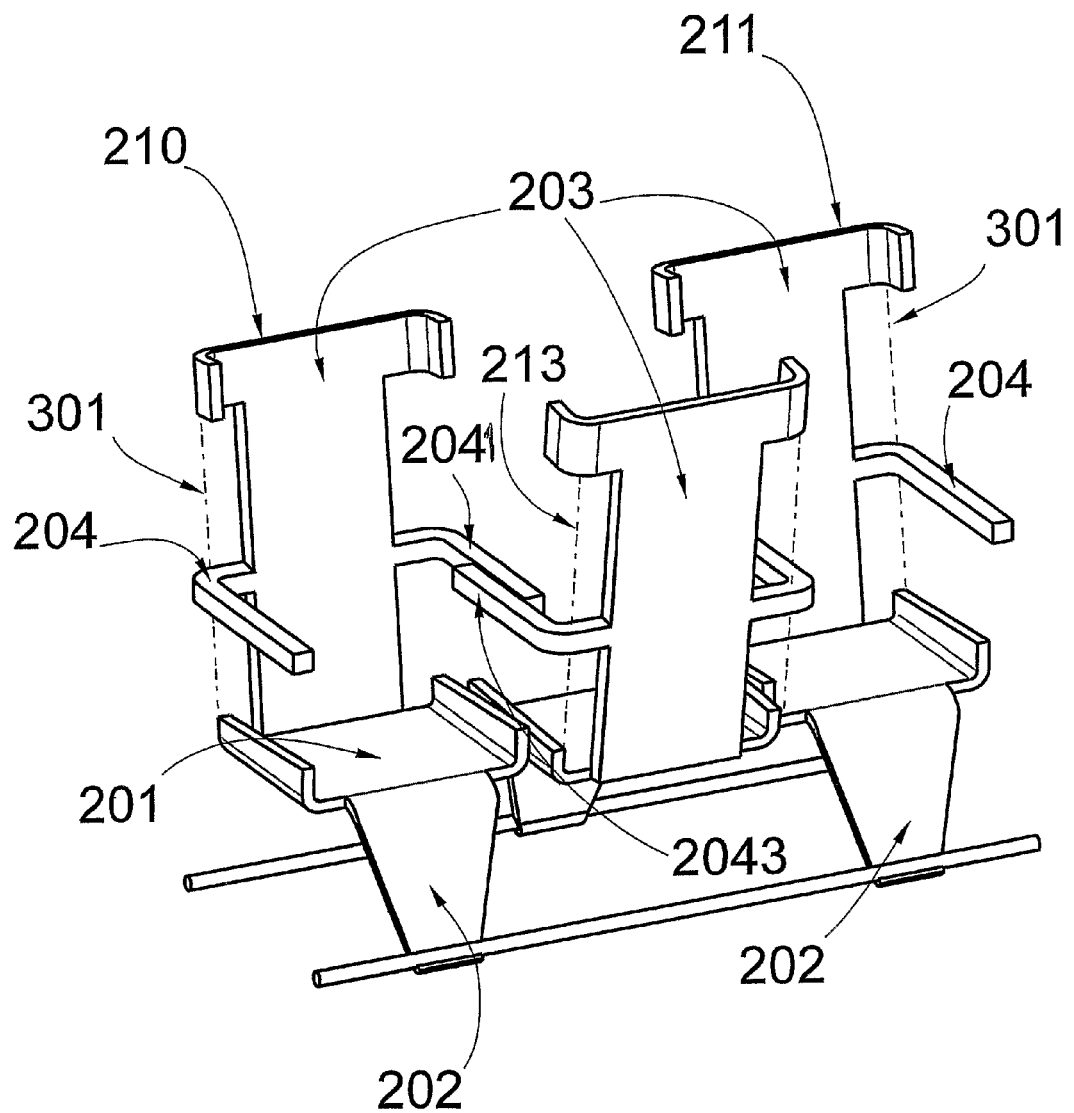
FIG. 18 is a similar view of another frame work in which the component parts of the individual seats are integral formations of composite panels.

In the alternative embodiment of FIG. 18, a modular form of construction is employed in which each seat framework is formed as a single skeletal molding having:
- a seat pan 201D,
- a front leg 202D,
- a back 203D,
- support arms 204D.

The left and right forwards facing seats 210D, 211D may be identical. The rear facing seat 213D is similar to the forwards facing seat, with its arm supports 2043D set further apart to overlap, outwards of the row, the arms 2041D of the other seats. The seat pans are of deep construction, to provide a beam structure at their level along the length of the row.

In another alternative shown by reference to dashed lines 301D in FIG. 18, a second modular form of construction is employed in which the modular moldings are carapacial and support the full extent of overlying upholstery.

Whilst the disclosure has been described with reference to aircraft seats, it has equal application to trains and other transport vehicles.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

I claim:

1. Aircraft transport seating comprising:
   a plurality of rows of seats, each row being formed as an integral unit and including at least two adjacent seats, each of the adjacent seats comprising a seat cushion a seat back and at least one arm rest,
   wherein the two adjacent seats in each row face opposing directions,
   wherein the seat cushions of adjacent seats are at least partially interdigitated,
   wherein the seat cushions define a row axis at the median axis of their interdigitated parts, the row axis extending along the row of seats,
   wherein the seat backs are arranged substantially equally spaced from the row axis while in upright position,
   wherein alternately facing ones of the seats are arranged along the row axis at a pitch less than conventional shoulder width, such that each at least one arm rest of each adjacent seat extends over and overlaps the seat cushion of the oppositely facing adjacent seat.

2. Aircraft transport seating according to claim 1, wherein the seats in the row are of equal width, the one with another, and that the row axis is straight.

3. Aircraft transport seating according to in claim 1, wherein end ones of the seats in the row are narrower than the other seats in the row and the row axis is curved.

4. Aircraft transport seating according to claim 1, wherein conventional shoulder width is defined as 22 inches or 560 mm.

5. Aircraft transport seating as according to claim 1, wherein:
   a. each seat has arm rests and
   b. alternately facing ones of the seats are arranged at such pitch along the row axis that the arm rests of seats facing in one direction extend partially over the seat cushion(s) of the oppositely facing adjacent seat(s).

6. Aircraft transport seating according to claim 1, wherein:
   a. each seat has arm rests and
   b. alternately facing ones of the seats are arranged at such pitch along the row axis that the arm rests of seats facing in one direction extend partially over space provided for the said seat cushion(s) to extend into on inclination of the respective back-rest.

7. Aircraft transport seating according to claim 1, wherein:
   a. each seat has arm rests and—alternately facing ones of the seats are arranged at such pitch along the row axis that the arm rests of seats facing in one direction extend partially over space left free by the one direction facing seat for the leg(s) of passenger(s) using the opposite facing seat(s).

8. Aircraft transport seating according to claim 1, wherein the arm rests of adjacent seats are aligned with each other.

9. Aircraft transport seating according to claim 1, wherein the arm rests of adjacent seats are continuous.

10. Aircraft transport seating according to claim 1, wherein the arm rests of adjacent seats are shaped for use by respective passengers.

11. Aircraft transport seating according to claim 1, wherein the arm rests of adjacent seats are provided with a central dividing rib.

12. Aircraft transport seating according to claim 1, further comprising:
   a. a divider extending or extensible between each pair of adjacent seats at least at head height in the seats.

13. Aircraft transport seating according to claim 12, wherein the divider is a screen extending forwards from one side edge at the top of the back of one seat to the nearest side edge at the top of the back of the adjacent seat.

14. Aircraft transport seating according to claim 12, the divider is drawable to allow conversation.

15. Aircraft transport seating according to claim 12, wherein the divider is serpentine, having portions on opposite sides of each seat cushion; whilst at shoulder level or at the levels of the tops of the seat backs, the divider is of re-entrant shape, providing greater shoulder width than the interdigitated seat cushion width.

16. Aircraft transport seating according to claim 15, wherein the divider extends down at the shoulder width to just below the level of arm rests and curves in at this level, whereby it partially overlies the seat cushion of the adjacent seat.

17. Aircraft transport seating according to claim 1, wherein the individual seats each defining a shoulder width, which overlaps in width with the shoulder width of the oppositely facing seat or seats in a next row in an array of rows of the seats, whereby the length of the row is less than the sum of the shoulder widths of the seats in the row.

18. Aircraft transport seating according to claim 1 wherein the seats have reclining backs.

19. Aircraft transport seating according to claim 18, wherein:
a. the seats have fixed back members,
b. the seat backs are adapted to recline with respect to the back members and—the seat cushions are adapted to slide forwards for inclination of the seat backs, the bottom of the backs being connected to the back of the seat cushions, whereby sliding forwards of the seat brings the bottom of the back forwards with it.

20. Aircraft transport seating according to claim 19, wherein
a. an inner back frame at a back portion of the transport seating and
b. an inner cushion member at a cushion portion of the seat structure,
  i. the back frame and the cushion member being hinged together, with:
  ii. the inner back frame resting against the seat back portion at an upper part thereof and
  iii. the inner cushion member being slidably mounted on the seat cushion portion, the arrangement being such that the inner cushion member can be slid forwards with the inner back frame reclining.

21. Aircraft transport seating according to claim 20, wherein the inner back frame rests against the seat back portion at a central position whereby the upper part of the inner back frame twists to accommodate a user twisting to one side in the seat.

22. Aircraft transport seating according to claim 20, wherein the back frame and the cushion member are molded of composite material.

23. Aircraft transport seating according to claim 1, wherein the adjacent seats in the row face in alternately opposite directions.

24. Aircraft transport seating according to claim 1, comprising a plurality of seat abutment wherein whilst the majority of adjacent seat abutments are between seats facing in alternately opposite directions, the row includes at least one pair of adjacent seats facing in the same direction.

25. Aircraft transport seating comprising:
a plurality of rows of seats, each row being formed as an integral unit and including at least two adjacent seats,
each of the adjacent seats comprising a seat cushion seat back and a shoulder width for accommodating the shoulders of a passenger when seated in the seat, the shoulder width being located in front of the seat back of the seat,
means for structurally unifying the seats in the row; and
seat legs extending down beneath the unified seats at their fronts, the back of each seat being supported by a seat leg beneath the front of an adjacent seat,
wherein the two adjacent seats in each row face opposing directions,
wherein the seat cushions define a row axis extending along the row of seats, and
wherein alternately facing ones of the seats are arranged along the row axis at a pitch less than conventional shoulder width, such that the shoulder width of each adjacent seat extends over the leg space of the adjacent seat.

26. Aircraft transport seating according to claim 25, wherein bottom ends of the seat-front legs are secured to floor-level beams extending at least substantially in the direction of the row, the floor level beams being secured in use to a floor of the aircraft on or immediately above the floor.

27. Aircraft transport seating according to claim 26, wherein the seats have individual structures and the structurally unifying means is a beam extending in the direction of the row with the seat structures connected to it.

28. Aircraft transport seating according to claim 27, wherein the seat-front legs extend down from the beam.

29. Aircraft transport seating according to claim 27, wherein the seat-front legs are part of the seats' individual structures.

30. Aircraft transport seating according to claim 26, wherein structural components of the seats and the row-wise beam are formed as a single framework, including the seat-front legs.

31. Aircraft transport seating according to claim 26, wherein the seats, their legs and the row-wise beam are formed as a single molding.

* * * * *